United States Patent [19]
Hasl et al.

[11] Patent Number: 4,880,368
[45] Date of Patent: Nov. 14, 1989

[54] IN-MOLD LABEL TRANSFER APPARATUS

[75] Inventors: Siegfried C. Hasl, 80 Liberty Corner, Warren, N.J. 07060; Charles J. Lisnet, Westport, Conn.

[73] Assignee: Siegfried C. Hasl, Warren, N.J.

[21] Appl. No.: 544,986

[22] Filed: Oct. 24, 1983

[51] Int. Cl.$^4$ .......................... B29B 11/06; B65C 9/14
[52] U.S. Cl. ........................................ 425/116; 271/95; 271/102; 271/132; 425/117; 425/127; 425/517; 425/26.1
[58] Field of Search ............... 156/539, 556, 566, 569, 156/570–572, DIG. 31, 564–565, 573, 580, DIG. 28–DIG. 31; 271/91, 93, 95, 49, 102, 131, 132; 414/125, 128; 264/509; 425/110, 112, 116–117, 126 R, 127, 129 R, 506, 514, 517; 137/859, DIG. 8

[56] References Cited

U.S. PATENT DOCUMENTS

| | | | |
|---|---|---|---|
| 3,292,209 | 12/1966 | Borkmann | 425/126 R |
| 3,324,508 | 6/1967 | Dickinson | 18/5 |
| 4,120,245 | 10/1978 | Karp | 156/384 |
| 4,124,436 | 11/1978 | Pettis, Jr. | 156/452 |
| 4,355,967 | 10/1982 | Hellmer | 425/522 |
| 4,359,314 | 11/1982 | Hellmer | 425/522 |
| 4,380,487 | 4/1983 | Zodrow | 156/571 |
| 4,418,906 | 12/1983 | Scott | 271/107 |
| 4,427,074 | 1/1984 | Wollin | 239/383 |
| 4,504,088 | 3/1985 | Carter | 271/18.1 |

OTHER PUBLICATIONS

Constellation Publication, Saxer Konstruktion AG, 3-81.

Primary Examiner—Merrell C. Cashion, Jr.
Attorney, Agent, or Firm—Larson and Taylor

[57] ABSTRACT

An in-mold label transfer apparatus. In a first embodiment transfer devices mounted on an extension device comprise a pair of label applicator heads which move transversely to receive labels and to deliver same to the mold surfaces. This transfer device comprises power actuated mechanical elements including rack and pinion, cam arm scissor and scissors arrangements. Another transfer device comprises a pair of side-by-side opposed piston and cylinder units. Other embodiments include transfer arms having label transfer heads at the ends thereof, the arms comprising rods movable from a first position placing the label applicator head at the mold and a second position completely outside of the mold, and whereat the label applicator heads are positionable relative to label magazines for receiving labels. A special label applicator head constructed resiliently to resiliently urge the label against the interior of a mold surface. One embodiment includes a valve element for cutting off the suction to the label applicator head as the latter applies the label against the mold surface.

17 Claims, 9 Drawing Sheets

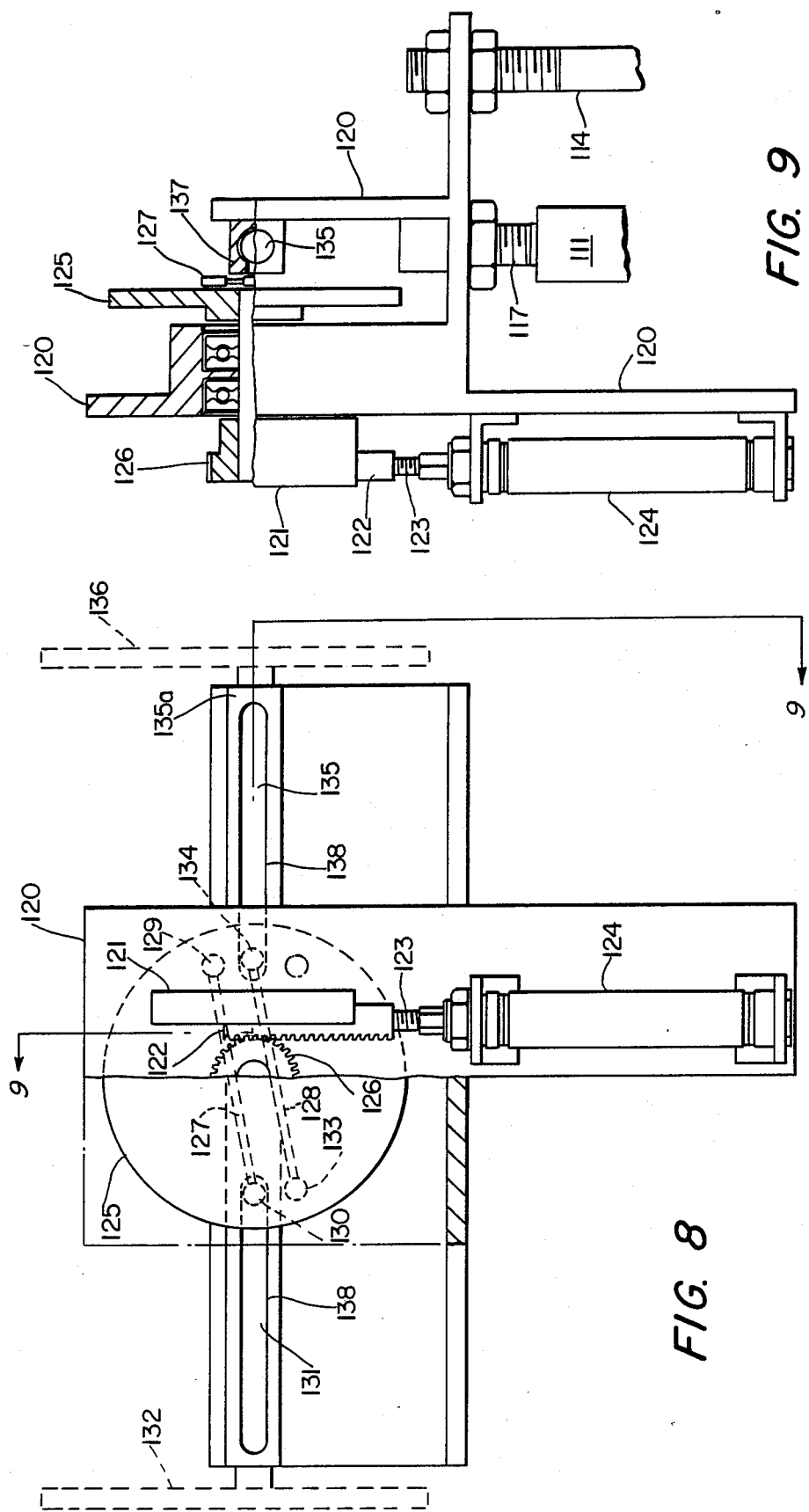

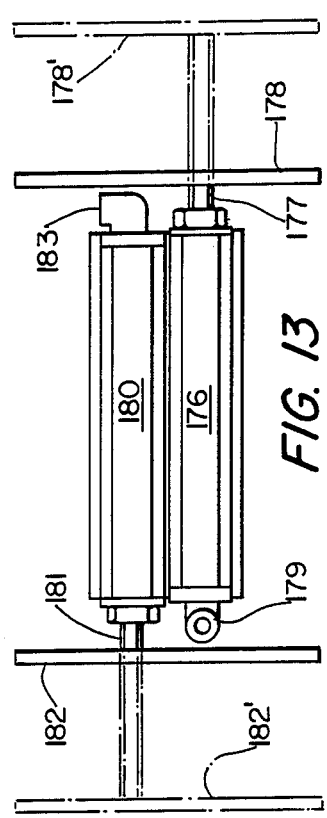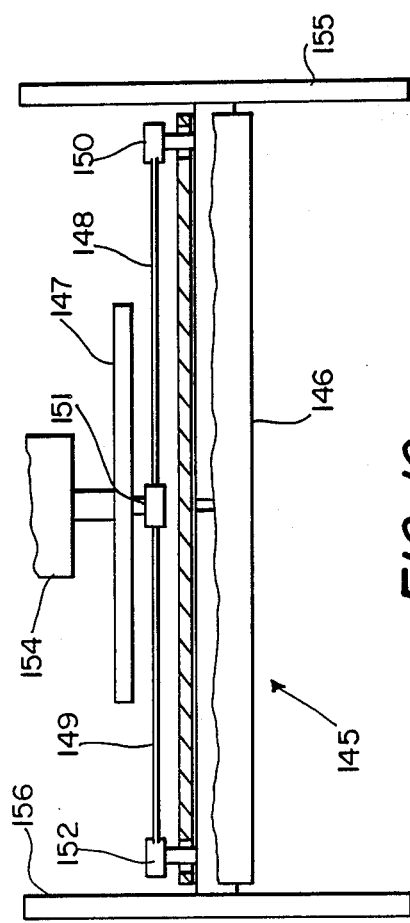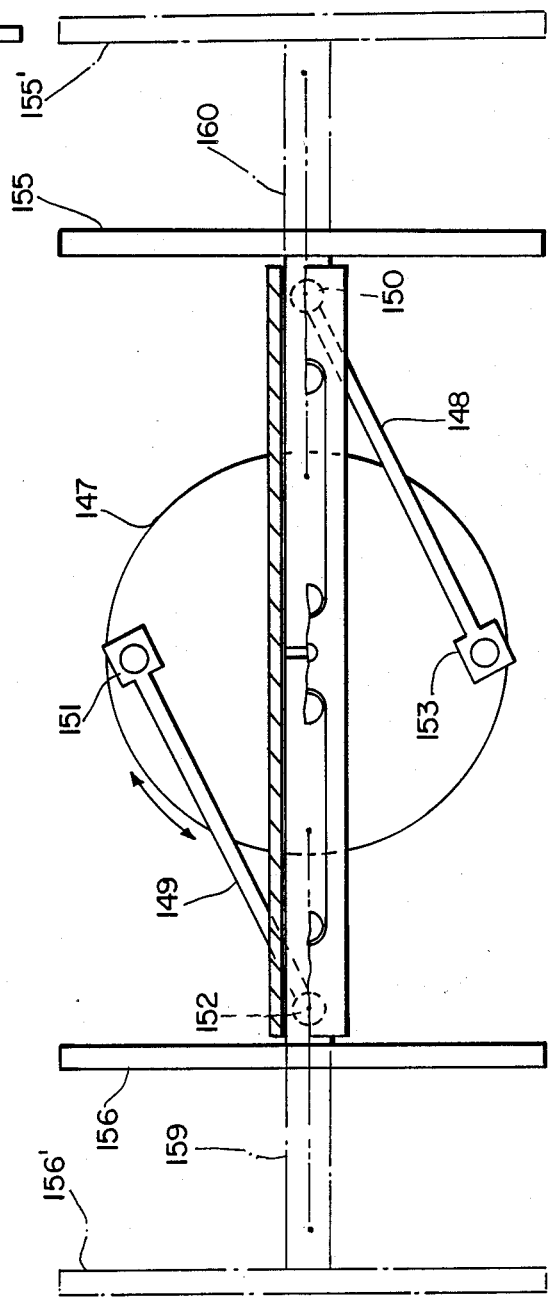

IN-MOLD LABEL TRANSFER APPARATUS

BACKGROUND OF THE INVENTION

This invention relates to the placement of labels onto plastic containers, and in particular it relates to apparatus for transferring labels from a label magazine into the mold cavity prior to formation of the container, such that the label can be attached to the container at the time of the blow molding of the container.

Viewed in its entirety, the containerization process involves forming the plastic containers, applying a label to the plastic containers and filling the containers with the product. Heretofore, the general practice has been to apply the labels to the bottles in the course of a separate step performed at some time subsequent to the formation of the bottles.

This conventional technique suffers from several disadvantages. Firstly, there is the apparent economic disadvantage associated with the machine, labor and overhead costs required to establish and operate a label applying step subsequent to the bottle formation step. Another economic disadvantage is that after being formed, the bottles must continue to be processed individually throughout the labeling and/or filling steps. In contrast thereto, if the labels are already present on the bottles at the end of the blow molding step, the bottles may immediately be grouped and delivered to filling stations designed to fill the bottles in groups rather than individually.

The container industry has recognized that the above described disadvantages can be eliminated if the labels are delivered into the open mold cavity to be applied to the bottles during the molding process. Previous arrangements are shown, for example, in the Dickinson U.S. Pat. No. 3,324,508, the Borkmann U.S. Pat. No. 3,292,209, and the two U.S. Hellmer U.S. Pat. Nos. 4,355,967 and 4,359,314.

While these prior patents do recognize the basic concept of applying labels into an open mold, the structures shown therein suffer from certain disadvantages which limit their applicability. For example, Dickinson shows a complex arrangement which deals primarily with the relatively difficult task of removing labels from a roll rather than a magazine; and this patent, unlike the present invention, does not address the more delicate problem of properly placing the label into the open mold cavity. For example, Dickinson relies upon static electricity which is more difficult to control than pneumatic forces. Also, when fully analyzed, the movements of the transfer arms into the open mold cavity undergo a complex, non linear motion which is not conducive to the accurate positioning of the labels within the open mold cavity. Borkmann is similar to Dickinson in that it relates to the transfer of labels from a roll rather than from a magazine, and like Dickinson, Borkmann is primarily concerned with the difficult task of removing labels from a roll. Also like Dickinson, Borkmann shows and describes a relatively complex mechanical movement which does not lend itself to accurate and proper positioning of the labels into the open mold cavities. Specifically, in each of Dickinson and Borkmann the mechanical movements of the transfer arms in the vicinity of the open mold cavity include transverse components at the moment of transfer of the label from the transfer arm to the mold cavity, which component would tend to "scuff" the label as it is transfered to the mold cavity, thereby possibly damaging the label and minimizing the ability to perfectly position the label within the mold cavity.

The two patents to Hellmer are more relevant than Dickinson and Borkmann to the extent that they relate to the concept of transferring labels from a stack thereof in a label magazine rather than from a roll. However, these patents have other limitations. Firstly, it is apparent that these structures are relatively complex and it is believed would also suffer from the same "scuffing" problem discussed above with respect to Dickinson and Borkmann.

However, the Hellmer patents have another disadvantage in that they are limited to only certain types of blow molding machines. Commonly used blow molding machines include the "shuttle" and "slide" types. These types of machines are characterized by the fact that all of the procedural steps including introducing the preform, known as a parison, closing the mold cavities, blowing the parison into a container, opening the mold cavities and removing the formed container are carried out at a single or possibly two different stations. With all of these steps being performed at a single or two stations, there are problems which must be overcome concerning the mounting and arranging of an additional apparatus, in this case a label transfer apparatus, so as not to interfere with the mechanisms required for the other steps. There are other types of blow molding machines known as the "merry go round" or "ferris wheel" types wherein the mold halves travel to a large number of different stations, generally with a single step being preformed at each station. These machines provide far greater flexibility in the mounting and arranging of any specific apparatus. For example, the designer can simply provide an open station at which to mount a label transfering apparatus without having to concern himself with the closing of the blow mold or any other steps being performed at that station. In this context, the Hellmer patents suffer from the disadvantage that they are applicable, as shown, to the ferris wheel or merry go round types, but are not applicable to the shuttle or slide types. Movement of the mold halves into the vicinity of the label transfer apparatus, via a cam mechanism causes a rod to move against spring tension to carry a label from the magazine into the mold cavity. No external power is required for this movement. It is apparent that this mechanism could not be used with a shuttle or slide type of blow mold apparatus since this transfer apparatus has no means to remove the transfer arm from the space between the mold cavities other than by movement of the mold cavities away from the transfer apparatus. Hence, if utilized in a shuttle or slide type, the transfer arms would become crushed when the mold halves were pressed together for the blow molding step.

Copending application Ser. No. 524,193 filed Aug. 18, 1983, by one of the inventors herein, discloses and claims the basic concept of the present improved label transfer apparatus. However, further sepcific improvements thereof are necessary in order to extend the applicability of this basic concept.

Hence, there exists a need for further new improvements in an apparatus for transferring labels from a magazine into an open blow mold cavity, so that the apparatus will more readily overcome the disadvantages and limitations which existed in the prior art and have wider applications in the container industry.

SUMMARY OF THE INVENTION

It is a purpose of the present invention to provide a new and improved in-mold label transferring apparatus which overcomes the disadvantages and limitations which have existed in the prior art.

The inventions is especially adapted for use with a blow molding machine and will therefore be described in detail only with respect thereto. However, it will be understood that the present invention may also be applicable to other types of molding machines such as vacuum, deep draw plastic forming machines or injection molding machines.

More specifically, the present invention recognizes that the label application procedure requires recognition and evaluation of the overall bottle formation process. Basically, the mold halves move away from each other to dispose of the formed bottle and to receive a new parison, after which the mold halves move together to enclose the parison for the subsequent blowing and settling steps which could take approximately six to ten seconds. Thereafter, the mold halves are separated from each other for removal of the formed bottle and for initiation of a new cycle. A first feature of the present invention is therefore the recognition of the advantage to be gained in designing a label transfer apparatus in a manner which utilizes knowledge of the overall blow molding cycle. While obviously movement of a transfer arm into the space between the cavities can be carried out only when the mold halves are separated from each other, knowledge of the present principle allows one to design the overall transfer apparatus such that it can maximize utilization of the mold closed portion of the cycle for carrying out steps in the label transfering operation other than the step of carrying the labels into the space between the mold cavities. With a properly designed system, the present invention will delay the overall cycle, i.e. specifically delay the mold open portion of the cycle, by no more than one second.

One particular feature of in-mold labelling concerns the appearance and structure of the combination label and bottle. Firstly, appearance is immensely approved since the label edges are not turned up, and in fact they are hardly physically perceivable, as if the labels had been painted on the bottle rather than applied thereto. An additional advantage is that a label applied in this manner is so closely intergrated with the structure of the bottle itself that it adds to the structural integrity of the bottle, thereby making it possible to eliminate a small volumn of plastic from each bottle. When dealing with thousands or millions of bottles, this slight reduction in bottle weight could represent a significant cost saving.

Another feature of the present invention is its recognition of the different stages in the overall label transferring operation such that the conditions within each stage can be optimized.

A first stage is the label receiving stage wherein the label applicator cooperates with the label magazine to receive a label in the proper position or orientation. The second stage is the positioning stage, during which the label applicator is conveyed from the magazine to a location between the open mold halves. The third stage is the label application stage during which the label applicator physically applies the label to the proper location in the proper orientation against the surface of the mold cavity.

The label application stage requires that the label applicator be positioned up against the magazine so that it properly and rapidly withdraws a single label therefrom during each cycle. The label positioning stage requires less precision than the first or third stages and hence the system should strive for rapid completion of this stage. The third stage, the label application stage, is far more delicate than has been appreciated heretofore. This stage requires both speed and precision. These dual goals are difficult to achieve because the label is being conveyed from one holding force applicator to another, i.e. from the force of the label applicator head to holding force within the mold cavity; and moreover the label must be placed with very great precision or else the entire procedure is a waste since a bottle with an improperly placed label will probably be rejected.

These goals of the present invention are achieved through a number of embodiments which will be described in greater detail below. Generally, however, all of these embodiments have in common the concept of maximizing utilization of the overall cycle time and bringing the label against the mold cavity in a delicate controlled manner which assures prompt and proper placement of the label against the interior mold surface. This is accomplished by utilizing label applicator mechanisms which, during the last stages of movement against the interior mold surface are moving essentially directly toward that surface with an insignificant or no lateral component of motion.

A first embodiment of the present invention is applicable in an environment where access to the space between the mold cavities is possible from below. According to this first embodiment, one or more hinged arms (one for each cavity on that mold half) is fixed to the plate on which the mold half is also mounted for pivotal movement between a first position below the mold halves to a second position up into the mold cavity. In this embodiment the label magazines are movable to a position just beneath the mold halves such that when the mold halves close against each other (for the blow molding and settling steps) the label applicator heads are positioned to receive new labels from the label magazine.

Another embodiment of the present invention utilizes an extendable electrical hydraulic and/or pneumatic mechanism for conveying linearly movable label applicator heads from a first position spaced away from the mold halves whereat the label applicator heads receive new labels from respective magazines to an extended position within the space between the open mold halves, whereat the label applicator heads are moved transversely, preferably linearly, so as to positively position the label applicator heads, and hence the labels themselves within the respective mold cavities.

Although numerous transfer devices are known for effecting transverse movement of objects in opposite directions, there are described herein specific selected embodiments for moving the opposed label applicator heads transversely against the cavities in opposed separated mold halves, so as to apply a label to each cavity. The labels will of course be different and will constitute the front and back label of the bottle, respectively. These described arrangements include a crank arm arrangement, a rack and pinion, a pair of oppositely acting fluid operated cylinders and a scissor arrangement. In addition, they can include a ball-screw or spindle. These devices can be driven by an suitable power means such as air, oil hydraulics, a solid state electrical device, or any other electrical device.

In still another embodiment of the present invention the label receiving, positioning and label application steps can be combined in a single rotating mechanism which in one position receives a label while the molds are closed, and in another position delivers that label into a mold cavity after the mold halves are separated from each other.

Another feature of the present invention concerns the specific design of the label applicator head so as to facilitate a smooth accurate transfer of a label from the label applicator head to the interior of the mold cavity. This new design facilitates transfer of the holding force from the label applicator head to the interior of the mold cavity.

Hence, it is an object of the present invention to provide a new and improved in-mold labeling apparatus.

It is still another object of the present invention to provide a new and improved in-mold labeling apparatus which recognizes the overall blow molding cycle and utilizes different portions of the cycle to enhance the effeciency of the label transfering apparatus.

It is still another object of the present invention to provide a new and improved label transfer apparatus of a type wherein access to the space between the mold halves is from below, which apparatus employs movable label magazines together with a hinged label transfer head.

It is still another object of the present invention to provide a new and improved mechanism for direct movement of the label applicator heads from a label receiving position to a label applying position, together with several new mechanisms for effecting transverse movement to apply the labels to the interior of the mold cavities.

It is still another object of the present invention to provide a new and improved label transferring apparatus having a rotating turning arm which in one position receives a label during the closed postion of the mold cycle after which it rotates and turns to deliver that label to the interior of a mold cavity after the mold halves have separated.

It is still another object of the present invention to provide a new and improved label applicator head which facilitates the proper positioning of a label against the interior of a mold cavity.

These and other objects of the present invention will become apparent from the detailed description to follow, taken together with the accompanying drawings.

BRIEF DESCRIPTION OF THE DRAWINGS

There follows a detailed description cf preferred embodiments of the present invention which are to be read in light of the accompanying drawings wherein:

FIG. 8 is an enlarged view of a portion of FIG. 6.

FIG. 9 is a side elevational view of FIG. 8.

FIG. 10 is a plan view of another embodiment of a label transfer device.

FIG. 11 is a front elevantional view of FIG. 10.

FIG. 13 is a front elevational view of still another embodiment of a label transfer device.

FIG. 14 is a plan view of FIG. 13.

DETAILED DESCRIPTION OF THE PREFERRED EMBODIMENT

There follows a detailed description of preferred embodiments of the present invention, wherein like elements are represented by like numerals throughout the several views.

Figure 1:
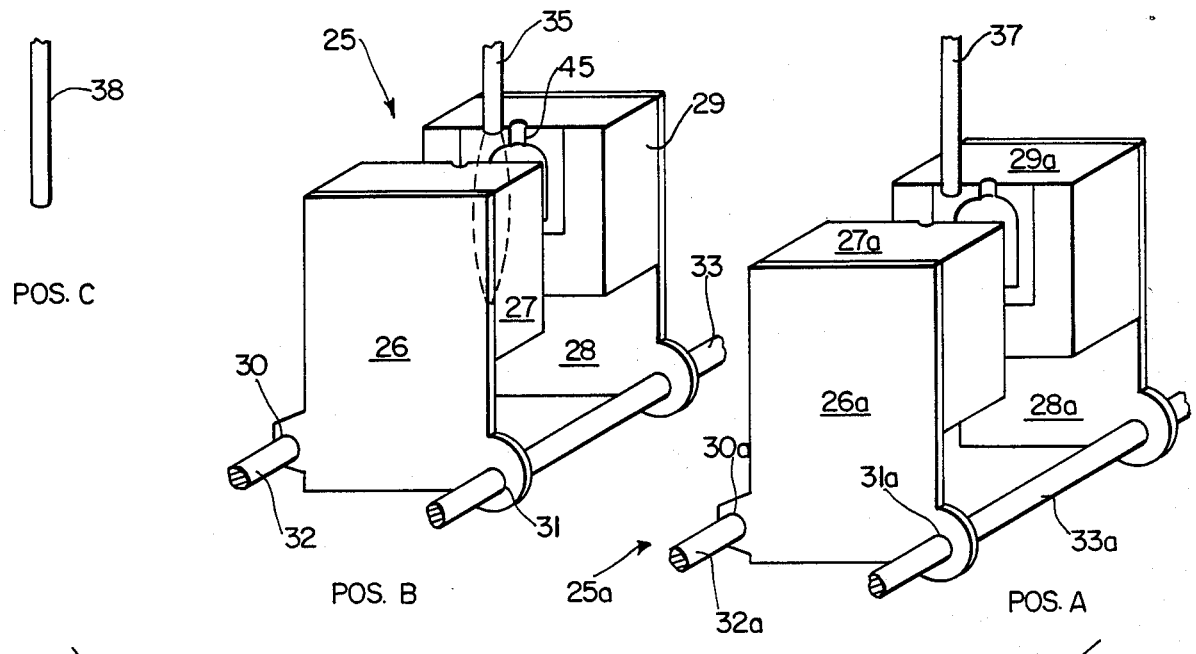
FIG. 1 is a schematic view illustrating a shuttle type blow molding apparatus.

FIG. 1 illustrates schematically the mold parts and the basic operation of a shuttle type blow mold assembly. The shuttle type blow mold assembly comprises two blow mold assemblies 25 and 25a. For simplicity, the elements in the second mold assembly 25a are the same as those used with respect to the first mold assembly 25, but with the subscript "a".

Each mold assembly comprises a pair of opposed plates 26 and 28, each mounting thereon a respective mold half 27 and 29. The mold halves 27 and 29 have formed in the facing surfaces thereof opposed cavities which, taken together, are in the shape of the bottle to be formed. Thus, as is known in the art, the mold halves 27 and 29 are removably mounted on the plates 26 and 28 so that different mold halves can be mounted thereon to form different bottle shapes while the plates 26 and 28 form a part of the blow molding machine itself. The plates 26 and 28 include first guide openings 30 and second guide openings 31 which are mounted on first and second guide rods 32 and 33, respectively, for guiding the plates 26 and 28 with their respective mold halves 27 and 29 towards and away from each other.

FIG. 1 illustrates the mold assembly 25a at a position A beneath a blow nozzle 37 and the mold assembly 25 at position B beneath a parison extrusion nozzle 35. A semi-liquid tubular parison 36 is shown extending downwardly from the nozzle 35.

In the operation of the shuttle type blow mold assembly, the two mold halves are spaced apart from each other in position B, at which time a semi-liquid plastic parison is extruded downwardly from the nozzle 35. At position B the mold halves move towards each other to form a closed blow mold cavity with the parison 36 located therein. Mold assembly 35 will then move downwardly to the left in FIG. 1 to position C which, like position A, includes a blow nozzle 38. At this time mold assembly 25a, now in an open condition would move up to position B to receive another parison. Mold assembly 25a would then undergo the same steps at position B and then when closed with a parison therein would move back down to position A, etc.

Whenever either of the mold assemblies 25 or 25a move downwardly to their respective blow nozzle positions A or C in the closed condition with a parison therein, the next step is to introduce pressurized fluid, generally air, through the blow nozzle into the parison located within the mold to form the container. The two mold halves then remain in the closed condition at position A or C, as the case may be, for a settle cycle of approximately six to ten seconds. Thereafter the mold halves are separated from each other and the bottle is removed either horizontally or vertically, depending on the construction of the specific blow molding machine.

Figure 1A:
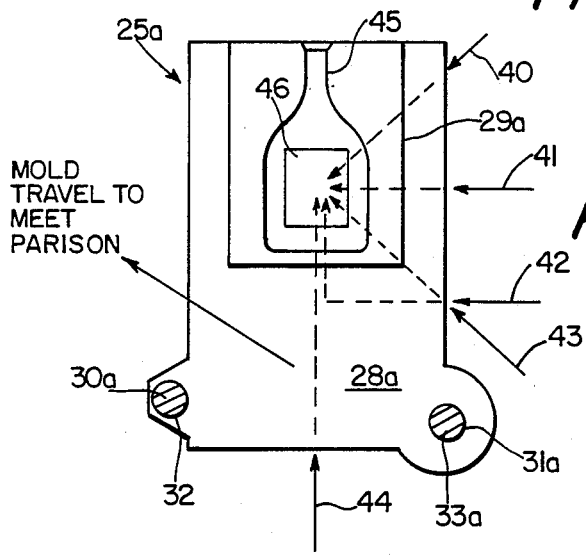
FIG. 1A is a schematic view taken through the plane between the separated mold halves and illustrating the directions of access of a label transferring mechanism into the space between the mold halves.

FIG. 1A is a front elevational view of the mold half 29a of FIG. 1 in position A. This figure illustrates the cavity 45 with a label area 46. After the finished, formed bottle has been removed, and while the mold halves are still separated from each other, the point in time is reached at which, in accordance with the present invention, a label would be introduced into the mold cavity in one or both mold halves, for example into the area 46 within the mold half 29a. Since access to the space between the mold halves is limited by guide rods 32a and 33a, the labels must be introduced either between these guide rods or in from the side. In this case the possible directions for introducing the label are illustrated by the arrows 40, 41, 42, 43 and 44 in FIG. 1A. Arrow 42 suggests a course which changes direction as the label travels to the label area 46. However, it will be understood that for other molding machines, access can be in any direction, i.e. from either side, above or below, as permitted by the machine design. Such arrangements will be discussed in greater detail below.

Figure 2:
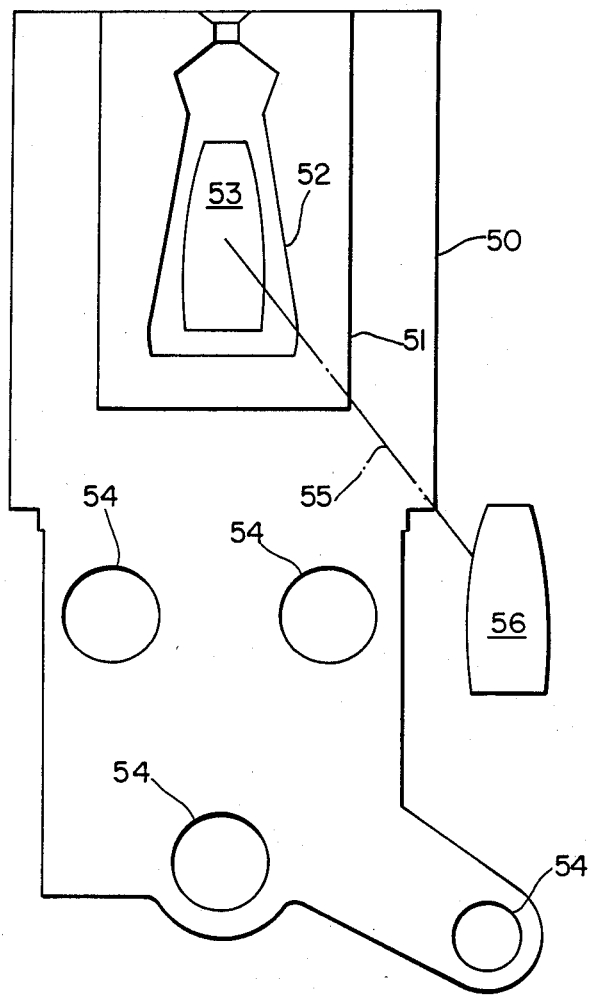
FIG. 2 illustrates a mold half which forms part of the blow molding machine.

Another type of blow molding machine is the "slide" type wherein the mold halves move towards and away from each other along a plurality of tie rods which are positioned so closely together beneath the mold halves that they in essence eliminate the possibility of access by a label transfer apparatus to the space between the mold halves from beneath the mold halves. A mold half which forms part of such a blow molding machine is shown in FIG. 2. As shown therein the mold plate 50 mounts a mold half 51 having a cavity 52 therein with a label area 53. Plate 50 is slidable along the four tie rods 54. For such an arrangement, the label transfer apparatus must convey the label from the side. FIG. 2 illustrates preferred arrangement wherein the label travels along a line 55 picking up a label at location 56. The specific direction illustrated in FIG. 2 was selected as being especially suitable for one specific type of blow molding machine wherein access from above is more limited. However, for other types of slide blow molding machines having a plurality of closely spaced tie rods below the mold halves, it may be preferable to introduce the labels from other directions such as in the direction of the arrows 40 or 41 in FIG. 1A.

Figure 3A:
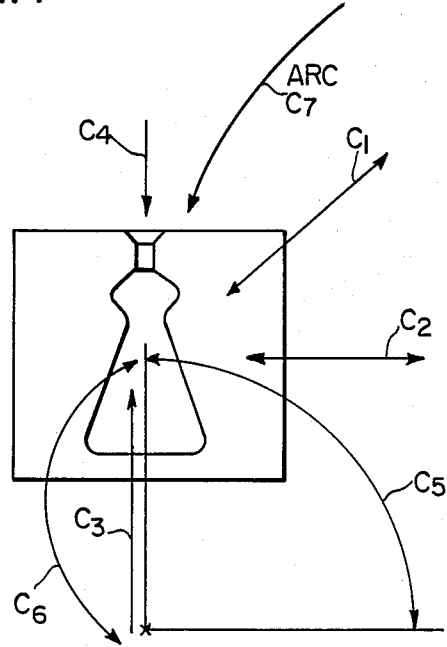
FIG. 3A is diagramatic sketch further illustrating the principle of operation as diagramed in FIG. 3.
Figure 3:
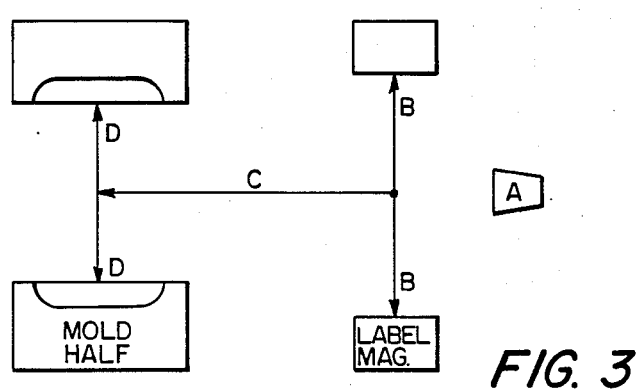
FIG. 3 is diagramatic view illustrating the different steps in the label transferring operation.

FIG. 3 illustrates the basic concept of taking advantage of the overall mold cycle in the design of a label transfer apparatus. In any blow molding machine, the mold halves are closed upon each other for a portion of the cycle, the blowing and settling portion, and separated from each for other portions of the cycle, the introduction and removal portions. Obviously, the label can be introduced into the mold cavity only during the open portion of the cycle, and after the last formed bottle has been removed. Obviously there will be some delay time in the cycle as the label transfer apparatus introduces the label into the mold cavities However, this delay time can be minimized if the label transfer apparatus is designed to complete as much as possible of its cycle wile the mold halves are closed, thereby minimizing the time required for the actual label introduction step when the mold halves are open. Such design is subject to a number of limitations. The first limitation concerns the limited area of access to the space between the mold halves, as already described above. In addition, it is desirable not to attach the magazines containing the stacks of lables on the mold halves themselves since their movements towards each other are abrupt and could easily disrupt the stack of labels within the magazines.

In order to achieve the above described design goals, the present invention recognizes that label introduction involves a number of different stages, and suitably the operation and construction during each stage will be optimized.

Refering to FIG. 3, the first stage, which may or may not be necessary, depending on the particular blow molding machine, is a pure rest stage A. The second basic stage is the label receiving stage, during which time the mechanism interacts with the label magazines for receiving a label. The next basic stage is positioning stage C during which the labels are carried from the vicinity of the label magazines to the space between the mold halves. The third stage is the label applicator stage during which the labels are carried into and against the appropriate surfaces on their respective mold halves.

FIG. 3A illustrates diagramatically different variations of the positioning stage C. Due to the variety of blow molding machines and the different methods for moving the molds and receiving the semi-liquid parison, etc., it is recognized that movement during the positioning stage C might possibly require movement in difference planes and along different lines. As shown in FIG. 3A, movement might be along straight line paths $C_1$, $C_2$, or $C_3$ similar directions on the opposite side, or $C_4$. In addition, as will be described in greater detail below, positioning movement can occur along angular paths represented by arrows $C_5$, $C_6$ or $C_7$.

Since suction is the main force contemplated for holding the label on the applicator head and inside the mold cavity, the following discussion will describe in detail only the use of suction. However, it is contemplated that other holding forces can be employed. For example if the labels contain a ferrous metal, magnetic holding means may be used on the label applicator head and in the mold Other holding forces include a releasable heat sensitive glue or other releasable adhesive.

Figure 4:
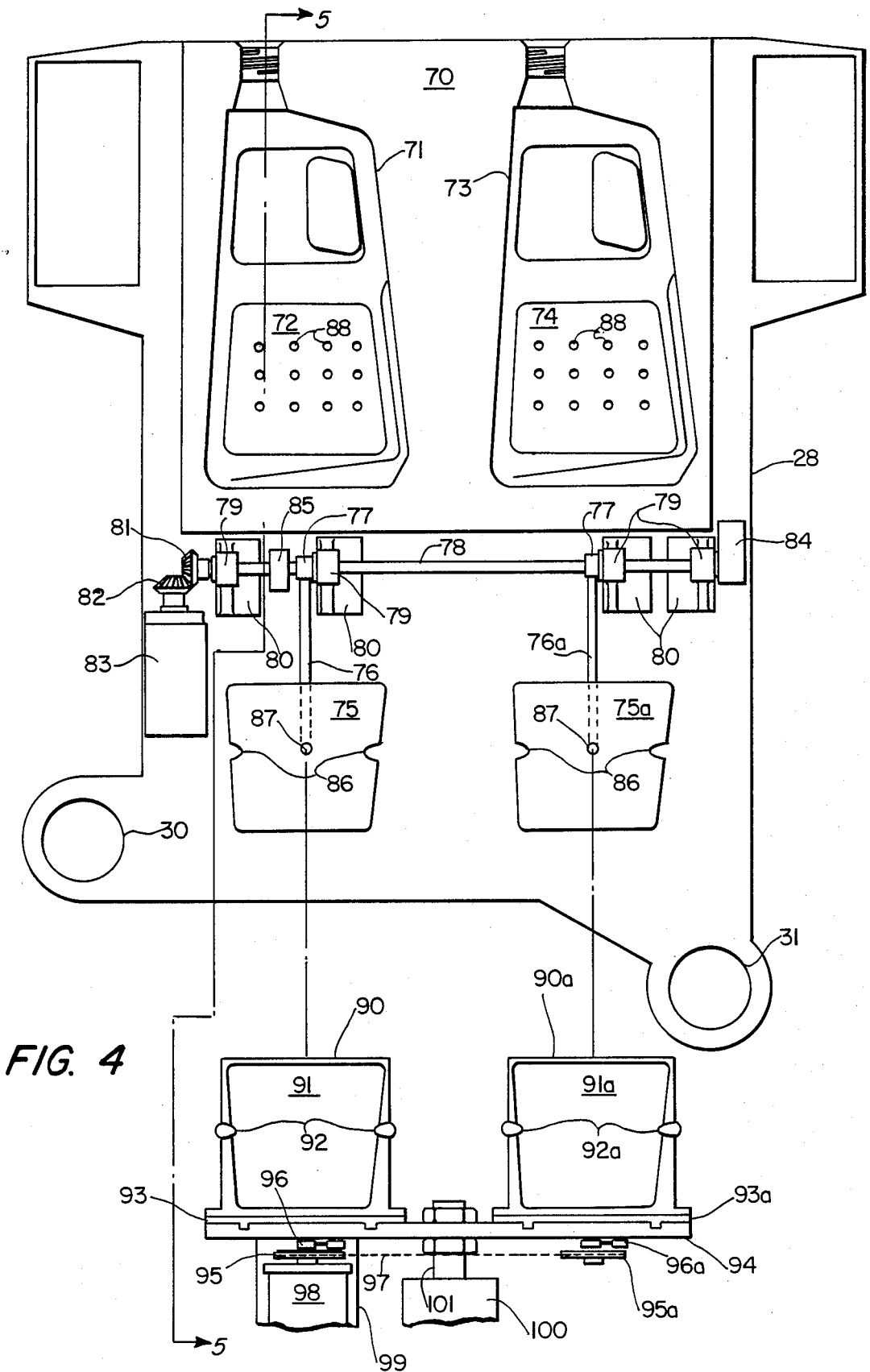
FIG. 4 is an elevational view taken in a plane separating a pair of mold halves, and illustrating a first embodiment of a label transferring apparatus.
Figure 5:
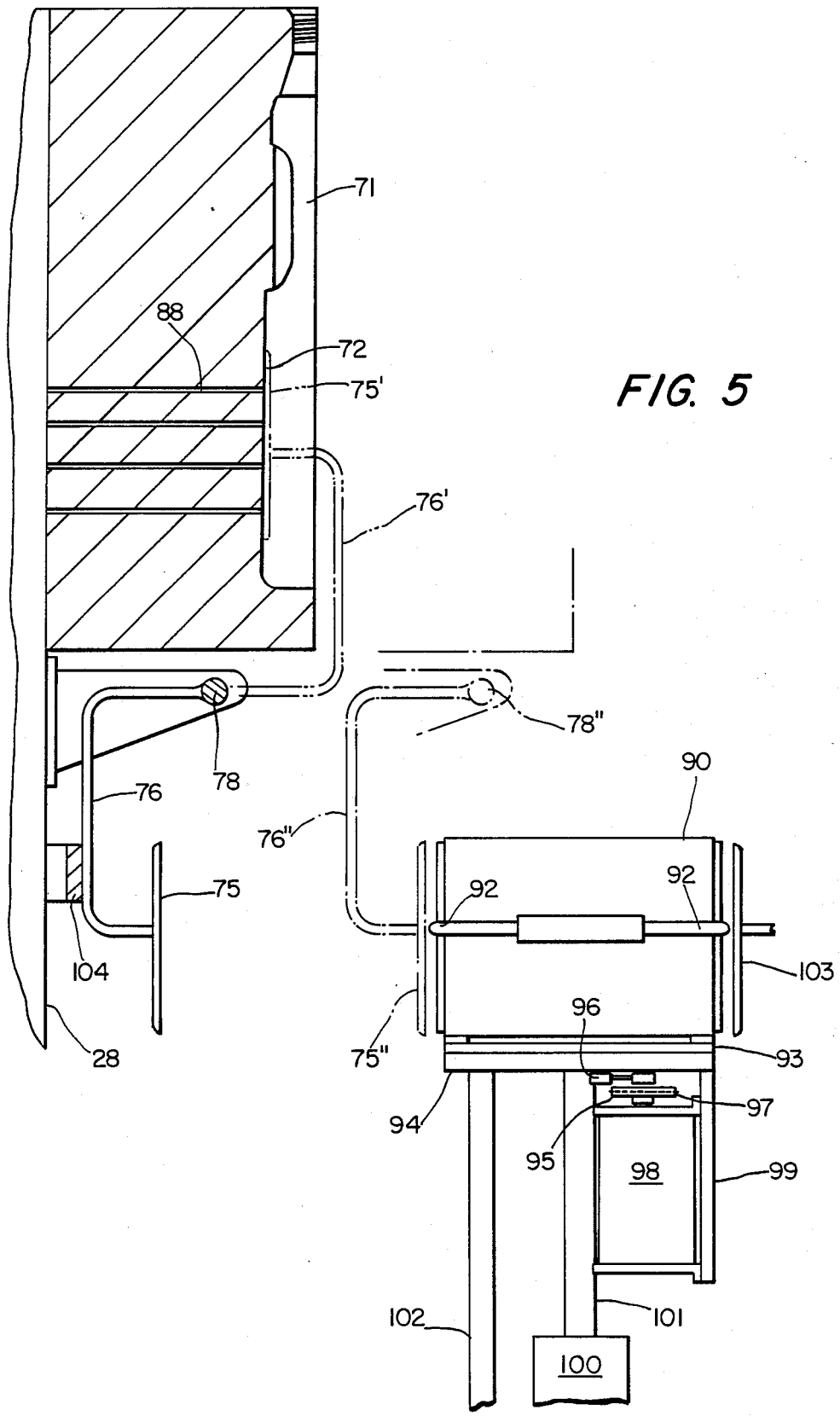
FIG. 5 is a side view taken along line 5—5 of FIG. 4, but with the label magazine raised and with the hinge arm shown in three different positions.

Refering now to FIGS. 4 and 5, there is shown one prefered embodiment of a label transfer apparatus. The particular apparatus is suitable for the type of blow molding machine having access from below. FIG. 4 illustrates the apparatus with the mold halves separated from each other, the label transfer head in a retracted position and the label magazines in the retracted postion. To avoid confusion, it will be noted that in FIG. 5 the label transfer head is shown in two other positions in addition to the retracted position. Also, the label magazines have been raised upwardly relative to their positions in FIG. 4.

In these Figures the plate 28 with apertures 30 and 31, corresponding to the same elements in FIG. 1, have mounted thereon matching mold halves, one of which, 70, is mounted onto plate 28. This particular mold half has one, two or more bottle cavities 71 and 73 having respective label areas 72 and 74. For purposes of economics, it is common in the blow molding industry to include a plurality of cavities in a given mold half so as to simultaneously form a plurality of bottles.

Refering to FIG. 4, there is shown a left label applicator head 75 and a right label applicator 75a, each having a connecting rod in the form of a hollow tube 76 and 76a, respectively, fixedly mounted on a shaft 78 via bearings 77. Shaft 78 is supported on mounting bearings 79 which are formed as a part of a mounting plate 80 which is in turn fixed to the plate 28. Referring momentarily to FIG. 5, it will be seen that the label applicator heads are pivotable from the position shown in FIG. 5 at 75 to the position shown in FIG. 5 at 75'.

At its left hand end, shaft 78 has mounted thereon a bevel gear 81 which meshes with another bevel gear 82 which is driven by drive source 83 which might be for example a servomotor, a stepping motor or a rotory actuator, any one of which can be driven by air, hydraulics, solid state electrical devices or a turbine. Since the various elements mounted on shaft 78 are not symmetrical, there is provided at the right hand end a counter weight 84. In operation it will desirable to have the heads 75 and 75a press against the areas 72 and 74 with only a limited force. One way to accomplish this is by means of a slip clutch 85 interconnecting the drive portion of shaft 78 with the remaining portion thereof. The heads 75 and 75a include cutouts 86 which, as will be described below, permit the heads to pass by the fingers 92 and 92a of the magazines to enter the magazines to receive a label. Also shown on FIG. 4 are openings 87 in the applicator heads through which a vacuum is applied to the label located thereon. Although the various fluid lines are not shown, it will be understood that this vacuum path extends from the openings 87, through the hollow tubes 76 and 76a to the vicinity of bearings 77 whereat they are connected with suitable fluid lines or through other external fluid lines other than 76 and 76a. Also shown in FIG. 4 are suction openings 88 in the label areas 72 and 74. As is known in the art, suction is applied through these openings in order to hold the label against the respective label area 72 and 74 after the labels have been transfered from the heads 75 and 75a to those said label areas.

Refering to the lower portion of FIG. 4, there is shown a pair of label magazines 90 and 90a containing a pack of labels 91 and 91a, held therein by holding fingers 92 and 92a, respectively or additional holding fingers. The label magazines are mounted on a slide plate 93, 93a, which plates are in turn mounted on a common subplate 94. Associated with each magazine is a rotating wheel 95, 95a which cooperates through a crank mechanism 96, 96a, passing through an opening in the subplate 94 with respect to magazines 90 and 90a. A common connecting chain 97 interconnects the respective rotating wheels 95, 95a. Rotation of the rotating wheel 95 and hence also the wheel 95a via chain 97 is effected through a servo or stepper motor 98 mounted on a plate 99. The entire magazine assembly is connected, via its subplate, to a cylinder 100 which is capable of moving the entire magazine assembly from the lower position as shown in FIG. 4 to the raised position as shown in FIG. 5. Also shown in FIG. 5 is a guide rod 102 to facilitate linear movement of the magazine assembly between its lowered and raised positions.

The embodiment of FIGS. 4 and 5 operates as follows. Referring to FIG. 5, the two mold halves are shown in the open, spaced apart condition. While the label transfer mechanism is shown only with respect to the left hand mold half, it will be understood that an identical label applicator structure is present on the right hand side for introducing a label into the opposite mold half. One label would be for the front of the bottle, and the other for the back of the bottle. For simplicity, only the left hand label transfer mechanism is shown in the drawing. The right hand transfer assembly is represented by the right hand label applicator head 103 shown in FIG. 5.

The label transfer apparatus of FIGS. 4 and 5 operates as follows. Since the label applicator head assembly is connected to the respective plates, they of course move with the plates as the mold halves are moved towards and away from each other. As mentioned earlier, this movement is quite forceful and hence it would not be suitable to mount the magazines on the plates. However, this does not preclude mounting of the applicator heads on the machine plates.

Starting from the point in the cycle when the mold halves are closing upon each other and upon the parison located therebetween, the applicator heads are moved along with the mold halves toward the positions shown in FIG. 5 at 75" and 103. Consistent with a goal of the present invention of effectively and effeciently using the overall cycle time, as the applicator heads are moved inwardly along with the mold halves, cylinder 100 is actuated, raising the piston rod 101 and hence also the entire magazine assembly from the position shown in FIG. 4 to the raised position shown in FIG. 5. Theoretically, the applicator heads 75' and 103 could be moved directly up against outermost label on each side of the label magazine 90. However, in practice, this would not be sufficiently reliable. Therefore, using the mechanism of the present invention, when the elements are in the position shown in FIG. 5, the stepper motor 98 is operated to turn the chain 97 through one cycle, during which the crank mechanisms 96 and 96a, engaging the slide plates 93 and 93a through openings in the subplate 94, move the magazines 90 and 90a first to one side to move the magazine up against one of the label applicator heads and then toward the other side to move it up against the other applicator head. In a manner known per se, a suction force applied through the connecting tubes will cause the outermost label in the magazine 90 to adhere to the respective applicator head.

With the mold halves then separated, the applicator head, with a label thereon, moves back to position 75 and the piston rod 101 is retracted. Motor 83 is then operated to turn shaft 78 and hence the applicator heads 75 and 75a about the axis of shaft 78, carrying the labels into the mold cavities to the position shown in FIG. 5 at 75'. At this time, in a manner known per se, the suction is removed from line 76' and applied through openings 88, causing the label to adhere to the interior of the mold cavity. The label applicator head is then retracted back to position 75, whereat its motion is limited by a suitable limiting pad 104. The cycle then repeats itself. Since the transfer device is connected to the mold half, its pivotal movement carrying the label into the mold cavity can commence, in a shuttle type machine, as the mold halves move up to pick up a new parison, thus preserving valuable cycle time.

Although FIGS. 4 and 5 illustrate the label transfer apparatus located beneath the mold halves, it will be understood that this assembly can be mounted differently off to the side of the mold halves or any other direction, for example, for a one or two cavity mold. Arranging the transfer heads and magazines so as to move horizontally from the side may provide certain advantages such as a shorter stroke. For mold halves having more than two cavities, it will of course be necessary to arrange the elements for movement above or from below as shown in FIGS. 4 and 5. The crank, wheel and chain mechanism used for shuttling the magazines to one side and then the other may of course be replaced by other similar mechanisms such as a rack and pinion, or any other power mechanism, as described above.

FIGS. 6 through 9 illustrate another embodiment of the invention. In this embodiment the entire label transfer apparatus is mounted on a cylinder to be extended into the space between the open mold halves. This structure is therefore sufficiently flexible to be used with either a shuttle type of blow molding machine as described in FIGS. 1 or a slide type as illustrated in FIG. 2.

This embodiment includes an extending mechanism 110 having a double acting air cylinder 111 with a fluid line 112 connected to opposite ends thereof. Other fluid lines as required for operating the cylinder 111 are known per se and are not shown in detail. A bracket 113 mounted on the cylinder 111 supports a guide rod 114, the purpose of which is to prevent other than linear movement of the extending mechanism. Guide rod 114 is supported in a sleeve 115 secured to an upper mounting plate 116.

At the upper end of the extending mechanism 110 there is provided a label transfer device comprising opposed label applicator heads 132 and 133 which are movable transverse to the direction of movement of the extending mechanism 110 to pick up a label from a label magazine (not shown) and to transfer the label into the mold cavities.

This transversly extending transfer device is shown in greater detail in FIGS. 8 and 9.

Figure 6:
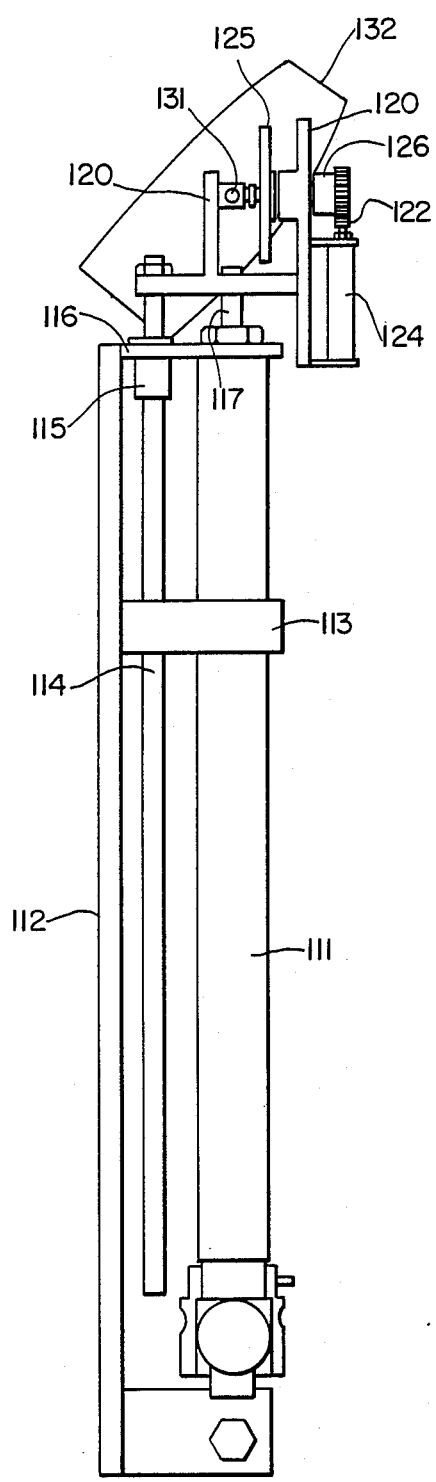
FIG. 6 is a plan view of another embodiment of a label applicator.
Figure 7:
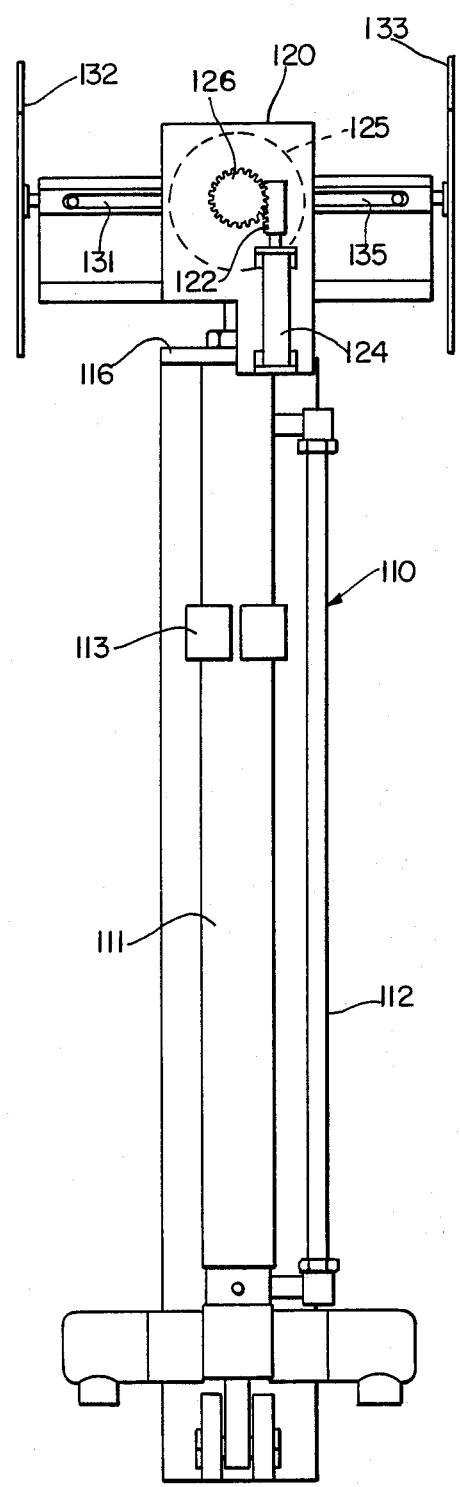
FIG. 7 is a side elevational view of FIG. 6.

As shown in FIGS. 8 and 9, and also with continued reference to FIGS. 6 and 7 a mounting bracket 120 has a guide 121 surrounding a screw threaded rack 122 connected to toothed piston rod 123. Linear movement of the rack and piston rod are effected via air cylinder 124. An advantage of this arrangement is that the stroke of cylinder 124 can be metered for a certain movement of wheel 125. The teeth of rack 122 in turn mesh with the teeth of pinion 126 which is fixedly mounted on a crank wheel 125. Crank wheel 125 includes a pair of crank arms 127 and 128. Crank arm 127 is connected at one end, at pin 29, to the wheel 125 and at its other end by a pin 130 to a rod 131. This rod 131 is connected at its outer end to the label applicator head 132 and slides in a guide housing 137 having an elongated opening 138 to guide the pin 130. A similar opening 138 guides pin 134.

Conversely, crank arm 128 is connected at one end 133 to the wheel 125 and at its other end, at pin 134 to a rod 135 which is in turn connected to the other label applicator head 136. The two rods 131 and 135 are slidably supported in a housing 137. The center of this housing is vented so as to prevent positive or negative pressure between the inner ends of the rods from effecting the movement thereof In an alternative arrangement, for small angular movements of wheel 125 the piston rod of the cylinder can be connected directedly to wheel 125. Of course the cylinder would have to be pivotally mounted.

The embodiment of FIGS. 6 through 9 operates as follows. Observing the angular positon of label applicator head 132 in FIG. 7, it will be understood that as shown, this embodiment is suitable for introduction of a label at the angle as shown by the line 55 in FIG. 2. Obviously this embodiment is suitable for introducing a label at any other angle which the particular blow molding machine can accomodate.

With the extending mechanism 110 retracted during the closed mold portion of the cycle, cylinder 124 is activated to turn the pinion 126, moving the crank wheel 125 and hence also the crank arms 127 and 128 through approximately 160° to extend the rods 131 and 135 and hence also the applicator heads 132 and 136. In a manner known per se, and not illustrated herein, the applicator heads would then be positioned adjacent their respective label magazines and suction applied to these applicator heads would cause a label to be drawn from the magazine to the respective applicator heads The magazines themselves would be fixedly mounted relative to the frame of the blow molding machine The crank arms then continue to move in the opposite direction for approximately another 160° to withdraw the applicator heads 132 and 136. Thereafter, and upon opening of the blow mold and removal of the formed bottle, air cylinder 111 would be extended to move the entire transfer device into the space between the mold halves A protrusion can be provided along the guide rod 114 which would engage bracket 113, thereby controlling the length of stroke of the piston rod 117 of the air cylinder 111.

The cycle of outward and inward movement of the applicator heads 132 and 136 would then be repeated in reverse to apply the labels against the inside of the mold cavities. As with the previously described embodiment, at the moment of impact of the applicator heads with the interior of the mold cavity, the suction is removed from the applicator head, permitting the suction force within the wall of the mold cavity to take over and hold the label.

Thereafter, the applicator heads are again withdrawn, the extender mechanism 110 is contracted and the blow molding cycle continues.

One particular advantage of the embodiment shown in Figures 6 through 9 is that with a crank mechanism of the type described outward movement of the label applicator heads proceeds rapidly during the first part of the stroke and then slows down at its outer limit which corresponds to the top dead center position of the crank arm. This has the advantage of facilitating the delicate placement and transfer of the label from the applicator head to the mold cavity.

FIGS. 10 through 15 illustrate alternative transfer devices adaptable for use with the extending mechanism 110 of FIGS. 6 and 7 for effecting transverse movement of the label applicator heads both at the label magazines to receive labels and at the space between the mold cavities to introduce the labels into the mold cavities.

The embodiment of FIGS. 10 and 11 is similar to the embodiment of FIGS. 8 and 9 except that it is relatively simplified in that the rack and pinion mechanism is replaced by a simple one cycle stepping motor, servo motor or rotary actuator 154 or other power devices. This actuator turns a crank wheel 147 to operate crank arms 148 and 149 which are connected at inner ends 153 and 151 to the crank wheel and at outer ends 151, 152 respectively to rods 159 and 160, respectively which are in turn connected to label applicator heads 155 and 156. As is apparent from FIG. 11, rotational movement of the drive motor and hence the crank arm 147 extends and retracts the label applicator heads.

Figure 12:
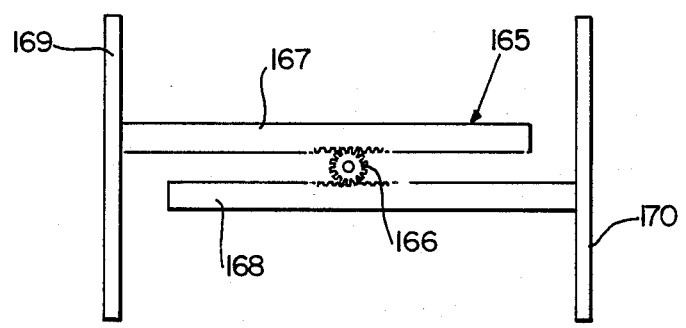
FIG. 12 is a schematic, front elevational view of another embodiment of a label transfer device.

FIG. 12 is a schematic illustration of a rack and pinion transfer device which may also be used to move the label applicator heads 169 and 170 transversely, this mechanism including a central pinion 166 which is rotatable through any suitable means such as that shown in FIGS. 8 and 9 or that shown in FIGS. 10 and 11. The pinion engages racks 167 and 168 which in turn mount the label applicator heads.

Figure 12A:
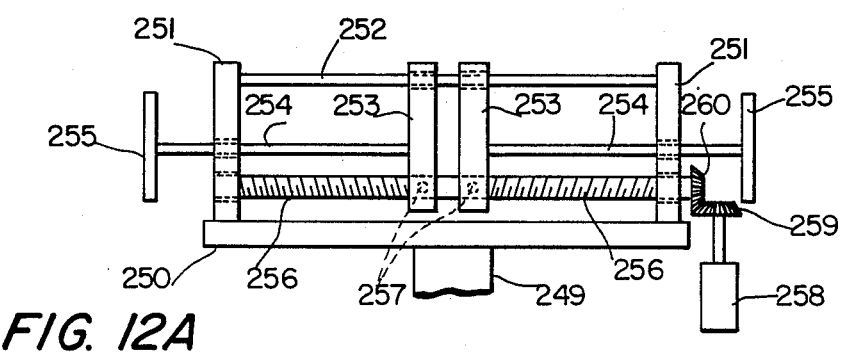
FIG. 12A is a schematic view of another embodiment of a label transfer device.

FIG. 12A illustrates schematically another embodiment of a label transfer device which is a ball-screw device.

A base plate 250 is mounted on the extension means represented at 249. A pair of brackets 251 mounted on base plate 250 have connected thereto a guide rod 252. A pair of movable guides 253 are slideably mounted for movement along the guide rod. A pair of actuating rods 254 are fixed at their inner ends to the movable guides 253 and extend slideably through the brackets 251. The label actuator heads 255 are mounted on the ends of the rods 254. A grooved screw 256 is rotatably mounted in the brackets 251 and includes a bevel 260 at one end thereof which meshes with another bevel 259 which is in turn connected to a driving source 258 which may be any suitable driving means such as an electric motor or a hydraulically or air actuated means. A pair of balls 257 which are retained by the movable guides 253 ride in the grooves of the grooved screw 256. Therefore, as will be apparent, upon actuation of 258, turning of elements 259 and 260, movement of the balls 257 along the screw will in turn move the movable guides 253 and hence also the rods and label applicator heads linearly.

Referring to FIGS. 13 and 14, there is shown a pair of fluid cylinders 176 and 180. These cylinders are mounted on a bracket 174 connected to the outer end of an extending piston rod 173. The cylinder 176 has fluid delivered thereto through a fitting 179 while at its opposite end it is connected via rod 177 to a label applicator head 178. The cylinder 180, having a fluid fitting 183, is connected through its rod 181 to the head 182. The extended position of the applicator heads are shown at 178' and 182'.

It will be noted from FIG. 13 that in this embodiment the piston rods engage the applicator heads off center. However, it is believed that this will not present a problem preventing the smooth and accurate operation of this embodiment.

Figure 15:
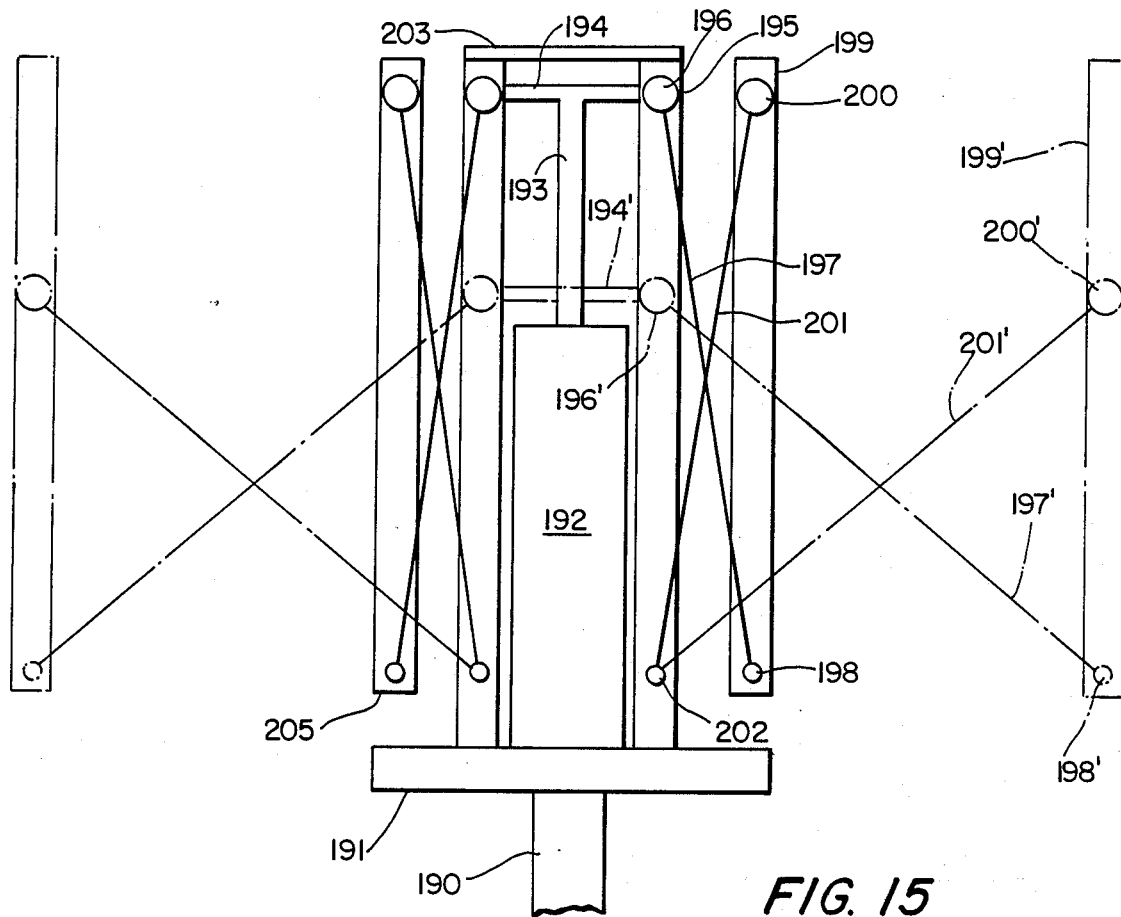
FIG. 15 is a schematic, plan view of still another label transfer device of the present invention.

FIG. 15 illustrates still another embodiment of the transfer device for moving the applicator heads transversly to receive and deliver labels. This figure shows schematically a scissors type arrangement which is so constructed that the applicator head moves outwardly, linearly.

Referring to FIG. 15, there is shown a positioning rod 190 having a base plate 191 connected thereto. An actuator cylinder 192, mounted on the base plate 191, has a piston rod 193 extending outwardly therefrom which in turn has an activator plate 194 fixed to outer end thereof.

Since the right hand and left hand sides of this mechanism are symmetrical, only the right hand side will be described and it will be understood that the left hand side is constructed and operates identically.

A guide housing 195 extends between the base plate 191 and an upper supporting connecting member 203 which connects guide housing 195 with the similar guide housing on the left hand side. Vertically movable within guide housing 195 is a roller 196 which is connected to a first scissors link 197 which is in turn connected to a fixed pivot point 198 which is located in the applicator head 199 which also serves as a guide member for receiving roller 200. The roller 200 is connected t a second scissors link 201 which is in turn connected to fixed pivot point 202 at its lower end within the guide housing 195.

The upper roller 196 is connected to the outer end of activator plate 194 such that vertical movement of the piston rod 193 and hence also the activator plate 194 moves the roller 195 from the solid line position as illustrated in FIG. 15, to the dotted line position represented by 196'.

As will be evident from the figure, when the piston within cylinder 192 is moved downwardly, bringing the activator plate 194 from the solid line position to the dotted line position 194', roller 196 moves downwardly to 196'. As will be apparent, this action forces all of the movable elements to move to assume the position shown in dotted lines on the right hand side of FIG. 15 with numerals designated with a "'". This of course represents the extended position of the applicator head 199.

The left hand side of FIG. 15 works in identical, symmetrical manner in order to extend and retract the other applicator head 205.

Figure 16:
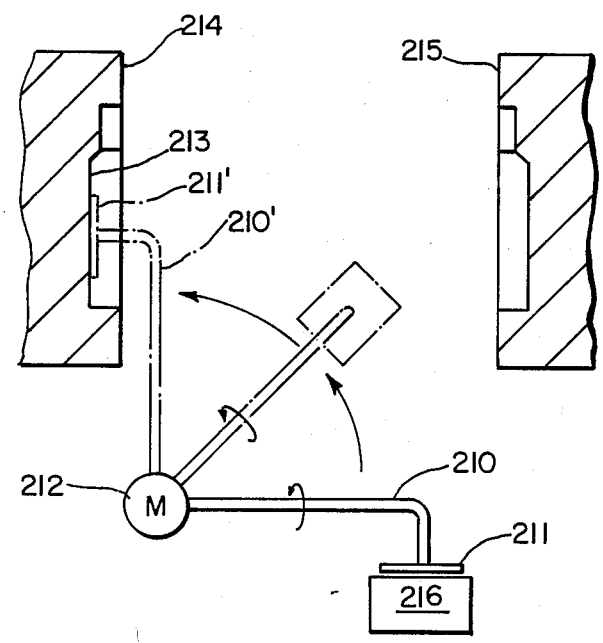
FIG. 16 is a front elevational view of still another embodiment of a label transfer device.
Figure 17:
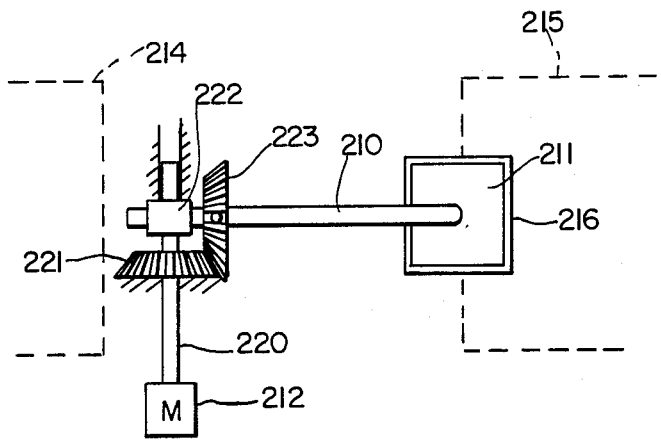
FIG. 17 is a plan view of FIG. 16, taken through a plane beneath the mold halves, but with the mold halves shown in dotted lines.
Figure 18:
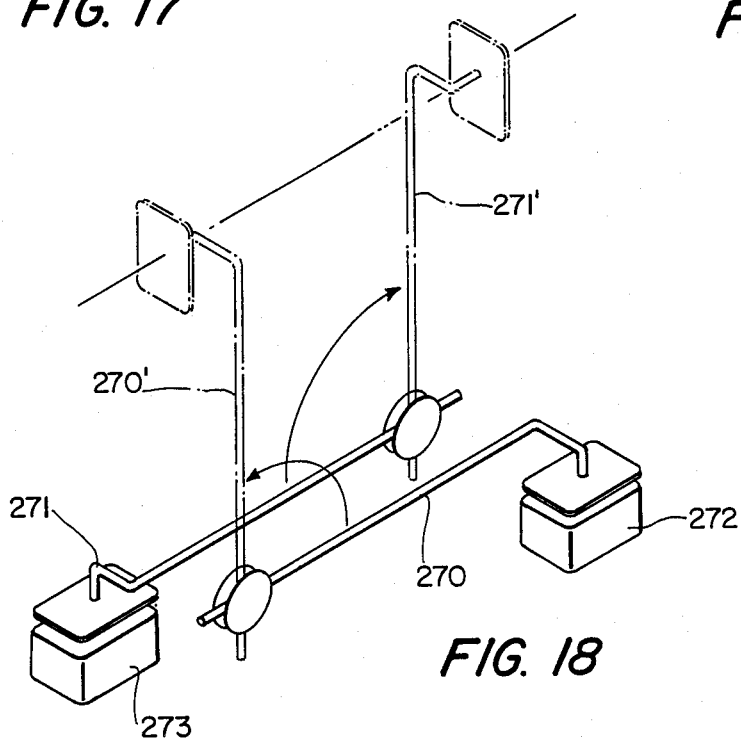
FIG. 18 illustrates schematically another embodiment of the present invention, which embodiment is a dual application of the embodiment shown in FIGS. 16 and 17, one for each opposed mold cavity.

FIGS. 16 through 18 illustrate still another embodiment of the present invention. In accordance with this embodiment, the label positioning and the label applying stages are essentially combined into a single rotary motion which can be mounted on one or both sides of the mold.

As shown schematically in FIG. 16, a connecting rod, in the form of a hollow tube 210 having an applicator head 211 is positionable against a label magazine 216, all of which are located below the level of the mold halves 214 and 215. Accordingly, with the applicator head 211 in position to receive a label from magazine 216, the mold halves 214 and 215 may close against each other for the blow molding and settling operations. After the mold halves have separated from each other, the formed bottle has been removed and the stage has been reached, for insertion of a label, motor 212 is activated. Referring also to FIG. 17 motor 212 turns a shaft 220 which is rotatably mounted within a fixed bevel gear 221. Turning of shaft 220 turns with it a bushing 222 which carries the connecting tube 210 slidably axially therethrough. A bevel gear 223 is fixed to the connecting rod 210.

As a result, when the motor 212 is actuated to turn the shaft 220 through 90° counter clockwise, the connecting rod 210 also turns 90°, but in addition, since bevel gear 223 rolls through its meshing engagement on bevel gear 221, the applicator head 211 is rotated 180° about its own axis. Obviously the design of the meshing gear teeth 221 and 223 can be selected so as to effect any degree of rotation of the rod 210 about its axis.

FIG. 18 shows schematically an embodiment which incorporates the principles of FIGS. 16 and 17 into a dual mechanism whereby two opposed transfer assemblies 270, 271 are mounted for simultaneously conveying labels from their respective magazines 272, 273 into opposite mold cavities. The feature of this embodiment whereby the applicator heads turn to be parallel to their plane of movement at an intermediate point of their movement from the magazine to the mold cavity is used to advantage in the dual transfer mechanism of FIG. 18 since the applicator heads 270 and 271, in this condition, can pass each other enroute from their respective magazines to their respective mold cavities.

It has been mentioned on numerous occasions heretofore that the task of physically transferring the labels from the applicator head to the interior wall of the mold cavity is a relatively delicate task. At this stage in the operation the force holding the label is transfered from the applicator head to the mold. Also, this transfer should take place relatively rapidly. And yet, through this stage of rapidly transfering the applied force from the applicator head to the mold, the transfer must be accomplished with very accurate positioning of the label. If not, the label will displaced from its proper position and most likely the bottle will be a reject. To facilitate smooth and accurate transfer of the label from the applicator head to the mold cavity, one feature of the present invention is an applicator head which cushions this engagement of the applicator head against the wall of the mold cavity.

Figure 19:
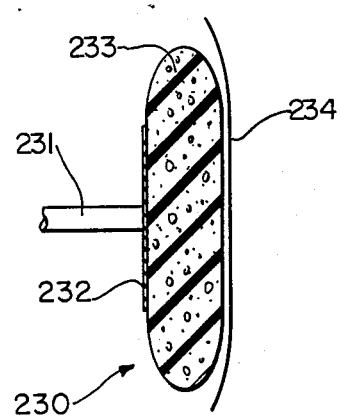
FIG. 19 is a sectional view through an improved label applicator head.

According, to a first embodiment of a cushioning applicator head, referring to FIG. 19, the applicator head 230 has a suction tube 231 terminating at a rigid plate 232. However, connected to this rigid plate 232 is a porous cushioned structure 233. The label 234 adheres to the outer surface of 233 since the suction effect through tube 231 is felt on the outer periphery of the structure 233. To enhance the presence of suction on the outer surface of structure 233, the plate 232 can be extended farther toward the outer periphery of the structure 233 or the tube 231 can be extended at least partially up into the structure 233.

With the embodiment of FIG. 19, as the applicator head with the label thereon is brought against the wall of the mold cavity, instead of a very abrupt metal to metal impact, the cushion permits the label to engage the mold cavity wall softly and resiliently, thereby creating a finite period contact during which the holding force can be effectively transfered from the applicator head to the mold cavity.

Figure 20:
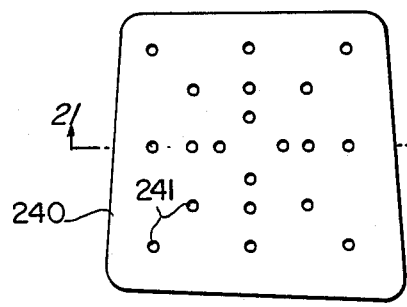
FIG. 20 is a front elevantional view of another embodiment of a label applicator head.
Figure 21:
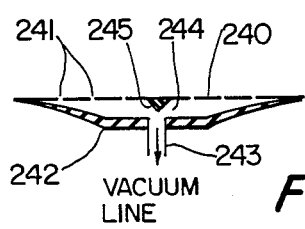
FIG. 21 is a sectional view taken along line 21—21 of FIG. 20.
Figure 22:
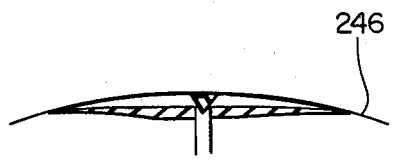
FIG. 22 is a view similar to FIG. 1, but showing the parts in a moved position.

FIGS. 20 through 22 illustrate still another embodiment of a label applicator head designed to cushion the impact of the applicator head and hence also the label against the mold cavity wall the applicator head includes a membrane 240 having a plurality of pin holes 241 therethrough. At its outer periphery the membrane is attached to the outer periphery of a base member 242 which is resilient but relatively stiff, such as plastic or a hard rubber material. A suction tube 243 extends through the base member 242 away from the membrane 240. A chamber 244 is thus formed between the elements 240 and 242. A concave, preferably conical valve member 245 is positioned on the interior of membrane 240, opposite the opening of tube 243.

The label applicator head shown in FIGS. 20 through 22 operates as follows. When the head is brought to a label magazine to pick up a label, with suction pressure applied through tube 243, and hence felt through the pin holes 241, the mechanism is placed against the top label of the pack, but not so hard as to allow member, 245 to close the opening 243. Consequently, a vacuum exists in chamber 244 which acts to withdraw the top label from the pack.

At the other end of its travel, when the label applicator head is delivering the label against the wall of the mold cavity, as shown in FIG. 22, the applicator head is pushed resiliently hard enough for the member 245 to enter and close the line 243. This shuts off the suction and creates compression within the chamber 244, thus aiding in transferring the label from the surface of membrane 240 to the wall of the mold cavity.

It will be understood that these improvements in label applicator heads are applicable to any of the label transfer apparatus described earlier in this application.

The operation of the various embodiments have either been discussed during the description of the respective embodiments or will be apparent.

Although the invention has been described with respect to specific embodiments, it will be apparent that the invention is capable of numerous modifications and variations without departing from the spirit and scope of the invention.

We claim:

1. An in-mold label transferring apparatus for placing labels onto a mold surface on at least one of two relatively movable mold halves of a molding machine, comprising:
    a magazine means for storing a stack of pre-cut labels with the front label of the stack accessible to be removed therefrom;
    a label applicator head;
    a rod, said head being mounted on said rod;
    a plate on which said one o the movable mold halves is mounted;
    a shaft having a longitudinal axis, said rod being connected to said shaft for movement about the said longitudinal axis of the shaft and with said head spaced from said shaft, said shaft being mounted to said plate to move with said plate and for rotational movement about the longitudinal axis of said shaft between a first position to place said head against the mold surface for delivery of a label to the mold surface and a second position to place said head and said rod completely outside of the space between the facing mold halves for receiving a label; and
    a power means for rotating said shaft to move said rod and said head between the first and second positions.

2. An apparatus according to claim 1, including means for applying a suction force to the or each label applicator head for holding a label thereon.

3. An apparatus according to claim 1, including a magnetic means for applying to the label holding force at said label application head.

4. An apparatus according to claim 1 wherein said rod is movable angularly through approximately 180° between said first and second positions.

5. An apparatus according claim 4 including a label magazine, mounting means for mounting the label magazine for movement from a retracted position away from the mold halves to an extended postion closer to the mold halves, said magazine, in said extended position, being located adjacent the label applicator head when the latter is in said second position and the mold halves are closed against each other.

6. An apparatus according claim 5, including a pair of said rods, each with a respective label applicator head, each rod mounted to a plate associated with one of said mold halves, said magazine means comprising a magazine assembly mounted on the mounting means and comprising one magazine for each label applicator head.

7. An apparatus according to claim 6, including means for reciprocating the magazine assembly back and forth into engagement with one and then the other of said label applicator head when the latter are in their second positions with the mold halves closed.

8. An apparatus according to claim 4, including a slip clutch in the line between the power means and the said rod to limit the force by which the label applicator head is applied against the inside of the mold cavity.

9. An apparatus according to claim 7, including a pair of said rods being mounted side by side.

10. An apparatus according to claim 1 and including a transfer means for transferring the front label of said magazine means to said head when said head is in the second position.

11. An apparatus according to claim 1 wherein said power means is attached to said plate.

12. An in-mold label transferring apparatus for placing lablels onto a mold surface on at least one of two relatively movable mold halves of a molding machine, comprising:
- a magazine means for storing a stack of pre-cut labels with the front label of the stack accessible to be removed therefrom;
- a label applicator head having a label engaging face;
- a rod having a longitudinal axis, said head being mounted on said rod such that said label engaging face is parallel to the longitudinal axis of said rod;
- a shaft having a longitudinal axis extending transverse to the longitudinal axis of the rod, said rod being connected to said shaft for movement about the longitudinal axis of the shaft and with said head spaced from said shaft, said shaft being mounted for rotational movement about the longitudinal axis of said shaft between a first position to place said head against the mold surface for delivery of a label to the mold surface and a second position to place said head and said rod completely outside of the space between the facing said halves for receiving a label;
- a power means for rotating said shaft to move said head between the first and second position; and
- a turning means for rotating said rod and said head about the longitudinal axis of said rod approximately 180° as said rod moves between said first and second positions.

13. An apparatus according to claim 12, said rod being movable angularly through approximately 90° about said shaft axis between said first and second positions.

14. An apparatus according to claim 13, said turning means comprising a pair of meshing bevel gears, one on said shaft, and one on said rod.

15. An apparatus according to claim 13 wherein said magazine means includes a transfer means for locating the front label in a plane parallel and adjacent to the plane of said label engaging face when said head is in the second position.

16. A label applicator head for receiving a label and transferring the label from a label supply to a delivery point such as at a wall surface of a mold, the label applicator head comprising:
- an apertured outer layer against which the label is held;
- a resilient base which forms a chamber between said base and said outer layer;
- a suction means for placing said chamber under suction, said suction means including a suction line located in said base across from said outer layer; and
- a valve element located on the chamber side of said outer layer opposite said suction line which closes said suction line when said outer layer is pushed sufficiently toward said base such as when the label is pushed against a hard surface, the closing of said suction line eliminating the suction in said chamber and creating a positive pressure in said chamber.

17. A label applicator head is claimed in claim 16 wherein said suction line includes a circular opening in said base and wherein said valve element is a conical plug attached to said outer layer opposite said circular opening which is received in said circular opening to eliminate the suction in said chamber.

* * * * *